United States Patent [19]

Ichida

[11] Patent Number: 5,362,157
[45] Date of Patent: Nov. 8, 1994

[54] LINEAR MOTION ROLLING GUIDE UNIT

[75] Inventor: Tomohiro Ichida, Gifu, Japan

[73] Assignee: Nippon Thompson Co., Ltd., Tokyo, Japan

[21] Appl. No.: 134,842

[22] Filed: Oct. 12, 1993

[30] Foreign Application Priority Data

Oct. 13, 1992 [JP] Japan ............................ 4-077176[U]

[51] Int. Cl.⁵ ............................................ F16C 29/06
[52] U.S. Cl. ........................................ 384/45; 384/57
[58] Field of Search ................ 384/43, 44, 45, 49, 384/59, 57

[56] References Cited

U.S. PATENT DOCUMENTS 3,008,774  11/1961  Morris et al. .................... 384/45
4,796,516  1/1989   Horváth ......................... 384/49 X
4,921,361  5/1990   Steeves .......................... 384/45
5,131,125  7/1992   Coron ............................ 384/45

Primary Examiner—Thomas R. Hannon
Attorney, Agent, or Firm—Browdy and Neimark

[57] ABSTRACT

This linear motion rolling guide unit gives a certain degree of freedom to the means for fixing components to the slider in order to reduce the overall height including the components mounted on the slider. The head of the bolt is inserted from the insertion opening through the insert dovetail groove into the dovetail groove, in which the bolt is slid to a position corresponding to the insertion hole formed in the component and inserted through the insertion hole and fastened. Since the position of the bolt can be adjusted by sliding the bolt along the dovetail groove formed in the upper surface of the casing, the position adjustment can be made easily even when the insertion holes in the component are somewhat deviated.

9 Claims, 5 Drawing Sheets

LINEAR MOTION ROLLING GUIDE UNIT

BACKGROUND OF THE INVENTION

1. Field of the Invention

The present invention relates to a linear motion rolling guide unit suitably applied for machine tools, industrial robots, precision processing equipment and testing equipment, in which sliders slide on track rails with a number of rolling elements interposed therebetween.

2. Description of the Prior Art

Linear motion rolling guide units generally have sliders mounted astride track rails with a large number of rolling elements interposed therebetween so that the sliders can slide on the track rails. The sliders can be guided forwardly and backwardly with high precision over relatively long distances. One such conventional linear motion rolling guide unit is shown in FIGS. 9 and 10.

The linear motion rolling guide unit shown in FIG. 9 includes a track rail 2 and a slider 1 straddling the track rail 2 in such a way that it can move relative to or slide on the track rail 2. The track rail 2 has raceway surfaces 5 formed in raceway grooves on longitudinally extending side wall surfaces 21 thereof. The slider 1 is slidably mounted astride the track rail 2. The slider 1 includes: a casing 3 having raceway surfaces 9 formed in raceway grooves at positions facing the raceway surfaces 5 on the track rail 2; a number of rolling elements 7 trapped between the facing raceway surfaces 5 and 9 to allow relative motion between the rail and the casing; ball retaining bands 18 enclosing the rolling elements 7 to prevent them from coming off the casing 3; under seals 8 to seal a gap between the track rail 2 and the casing 3; and end caps 6 attached to the longitudinal ends of the casing 3, the longitudinal direction being the direction in which the casing slides.

The casing 3 has its underside recessed to form a rail accommodating recess 10. Similarly, the end caps 6 are also formed with a recessed groove 12 (see FIG. 10) that straddles and accepts the track rail 2. The end caps 6 are each provided with an end seal 17 that provides sealing between the rail 2 and the slider 1. The end caps 6 also have a grease nipple 22 for supplying lubricant to the sliding surfaces between the rail 2 and the slider 1. The end caps 6 are also formed, on each side, with raceway grooves 13 and direction changing passages 11. The raceway grooves 13 cooperate with the track rail 2 to form raceways through which the rolling elements 7 move. The direction changing passages 11 in the end caps cause the rolling elements 7 to change their direction for circulation.

This linear motion rolling guide unit is constructed as described above, with the slider 1 mounted astride the track rail 2 and with the rolling elements 7 trapped between the track rail 2 and the slider 1 to allow the slider 1 to freely slide on the track rail 2. The rolling elements 7, which run loaded along the raceway surfaces 5 on the track rail 2, are led into the direction changing passages 11 formed in the end caps 6 and from there into return passages 14 formed in the upper part of the casing 3 parallel to the raceway surfaces 9, thus endlessly circulating through the endless circulation path. In this way, with the loaded rolling elements 7 trapped and running between the raceway surfaces 9 formed in the casing 3 and the raceway surfaces 5 on the track rail 2, the slider 1 and the track rail 2 can slidably move relative to each other. Radial loads and moment loads acting through the slider 1 in vertical and horizontal directions are born by the track rail 2.

The linear motion rolling guide unit shown in FIGS. 9 and 10 is generally used in an assembled condition shown in FIG. 11. That is, two parallel track rails 2, 2 are fixedly installed on a base 20; two or more sliders I are mounted astride each of the track rails 2, 2; a slide table 4 is secured to the sliders 1; then equipment put on the slide table 4 is moved back and forth in the direction of arrow G.

A means to secure the slide table 4 to the sliders 1 is constructed as follows. The upper surface of the casing 3 of the slider 1 is formed with four threaded holes 15 and the slide table 4 has bolt insertion holes 16 made in positions corresponding to the threaded holes 15. With the slide table 4 placed on the sliders 1, bolts are inserted through the bolt insertion holes 16 and then tightened to fix the slide table 4 to the sliders 1.

Instead of the slide table 4 with the planar upper surface as shown in FIG. 11, a slide table 24 with the upper surface formed with dovetail grooves 23 as shown in FIG. 12 may be used. Like the slide table 4 with the flat upper surface, the slide table 24 with the dovetail grooves is formed with bolt insertion holes (not shown) at positions corresponding to the threaded holes 15 in the casing 3 and is secured to the slider 1 in the similar manner.

With the conventional fixing means described above, however, the bolt insertion holes 16 formed in the slide table 4 must be aligned perfectly with the four threaded holes 15 formed in the casing 3 of the slider 1. Where two or more types of slide tables 4 are to be used interchangeably, each of the slide tables must have bolt insertion holes made in precisely the same positions. Conversely, to allow one kind of slide table 4 to be secured to various kinds of linear motion rolling guide units of different sizes requires that the threaded holes 15 be formed at the same positions irrespective of the sizes of the casings 3. These problems stem from the fact that the fixing means for the casings 3 and the slide table 4 has little degree of freedom. It is therefore an important task to increase the level of freedom of the fixing means.

In mounting a work on the slide table, a general procedure involves putting the dovetail-grooved slide table 24 on the casings 3 and fixing them together and then securing the work to the dovetail grooves 23 in the slide table 24. This increases the overall cross-sectional height due to the slide table 24 interposed, failing to meet the demand for lowering the overall height.

SUMMARY OF THE INVENTION

A primary objective of the present invention is to solve the above-mentioned problems and to provide a linear motion rolling guide unit, which gives a certain degree of freedom to a means for fixing components such as slide table, equipment and work to the slider in order to facilitate the position adjustment of the component with respect to the slider; which allows the fixing means to be set in the casing without having to remove the end caps from the casing; and which can minimize the overall height of the unit when the component is mounted on the slider.

It is an object of this invention to provide a linear motion rolling guide unit which comprises:
a track rail having first raceway surfaces formed in longitudinally extending side wall surfaces thereof;

a casing slidable relative to the track rail and having second raceway surfaces formed at positions facing the first raceway surfaces;

end caps attached to the longitudinal ends of the casing; and a number of rolling elements that circulate through raceways formed between the first raceway surfaces and the second raceway surfaces, through direction changing passages formed in the end caps and through return passages formed in the casing;

fixing means for fixing components to the casing;

dovetail grooves formed longitudinally in the upper surface of the casing so that the fixing means can be movably installed in the dovetail grooves;

insert dovetail grooves formed laterally in the upper surface of the casing so that the insert dovetail grooves can receive the fixing means and communicate with the dovetail grooves; and insertion openings formed by opening the insert dovetail grooves at the upper side surfaces of the casing.

In this linear motion rolling guide unit, the fixing means include a bolt having a polygonal head and a nut which is polygonal-shaped on the exterior and has a female thread with which the bolt engages. The dovetail grooves are arranged symmetrical with respect to the center line of the track rail to achieve a load balance. To make the casing height as small as possible, it is desired that the dovetail grooves be located outside the track rail.

In this linear motion rolling guide unit, the process of fixing the component to the casing of the slider involves first inserting one of the fixing means from the insertion opening, moving it through the insert dovetail groove into the dovetail groove, sliding the fixing means along the dovetail groove to a position corresponding to the insertion hole formed in the component, and then inserting that portion of the fixing means protruding from the casing into the insertion hole formed in the component. Because the fixing means can be adjusted in position by moving it along the dovetail groove formed in the upper surface of the casing, the component can easily be fixed to the slider even when there are some deviations in the position of the insertion hole cut in the component. When the dovetail grooves are formed in the longitudinal direction of the track rail, the component can be fixed to the specified position on the slider even when the position of the insertion hole in the component is deviated to some extent in the longitudinal direction.

The linear motion rolling guide unit of this invention permits the component to be directly secured to the casing itself because the dovetail grooves are formed in the casing. Hence, when compared with the conventional unit, in which the component is mounted on the dovetail-grooved slide table that is in turn secured on the slider, the overall height of the unit with the component mounted is smaller by an amount corresponding to the slide table, which is not used in this invention.

Further, it is preferred that the insert dovetail grooves communicating with the dovetail grooves be formed in the side surfaces of the casing. When there are no insert dovetail grooves, the component must be mounted by inserting the fixing means from the end cap side into the dovetail grooves. In this process, the end caps and end seals, which will hinder the insertion operation, must be removed temporarily before inserting the fixing means into the dovetail grooves. To enable the fixing means to be inserted without removing the end caps requires the height of the casing to be significantly greater than the height of the end cap, increasing the overall height of the unit. Therefore, forming the insert dovetail grooves in the side surfaces of the casing not only is effective in minimizing the height of the guide unit but also makes it very easy to mount the slide table to the casing.

The dovetail grooves may be formed in a direction perpendicular to the longitudinal direction of the track rail. In this case, even when the positions of the insertion holes formed in the slide table are slightly deviated perpendicularly with respect to the longitudinal direction, the slide table can be fixed to the slider. If the dovetail grooves are formed in a direction perpendicular to the longitudinal direction, the insert dovetail grooves are not necessary.

The linear motion rolling guide unit according to this invention has the features: that the dovetail grooves are formed longitudinally in the upper surface of the casing; that the insert dovetail grooves communicating with the dovetail grooves are formed laterally in the upper surface of the casing; and that the insert dovetail grooves are opened at the upper side surfaces of the casing to form insertion openings. Because of these features, when mounting the component to the casing of the slider, this invention offers the advantage that the fixing means can very easily be inserted into the dovetail grooves and that the component can be secured to the casing of the slider with ease even if the insertion holes formed in the slide table are somewhat deviated, by moving the fixing means along the dovetail groove to an appropriate location. Therefore, in mounting the slide table on the casings, the precision in the position of the insertion holes cut in the component does not matter much, allowing various kinds of components to be mounted according to use.

Furthermore, since the slide table can be secured to various kinds of casings with different sizes, mounting a desired component on the slide table can virtually be achieved by selecting an appropriate slide table with the desired component.

DETAILED DESCRIPTION OF EMBODIMENTS

Figure 1:
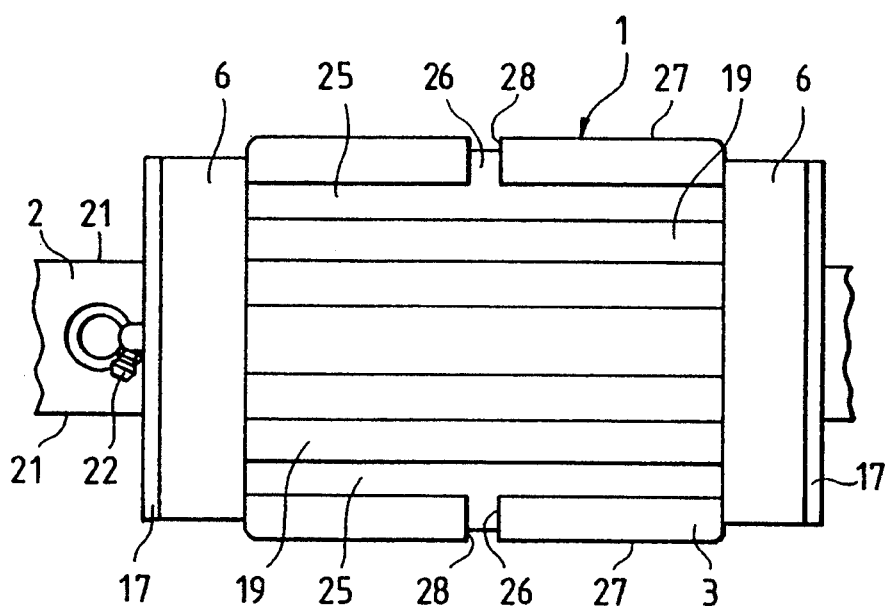
FIG. 1 is a plan view of the linear motion rolling guide unit according to one embodiment of this invention.
Figure 2:
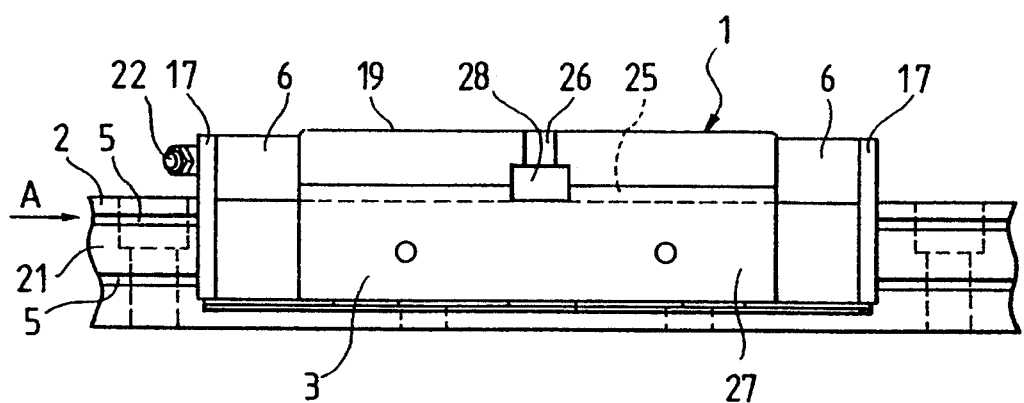
FIG. 2 is a side view of the linear motion rolling guide unit of FIG. 1.
Figure 3:
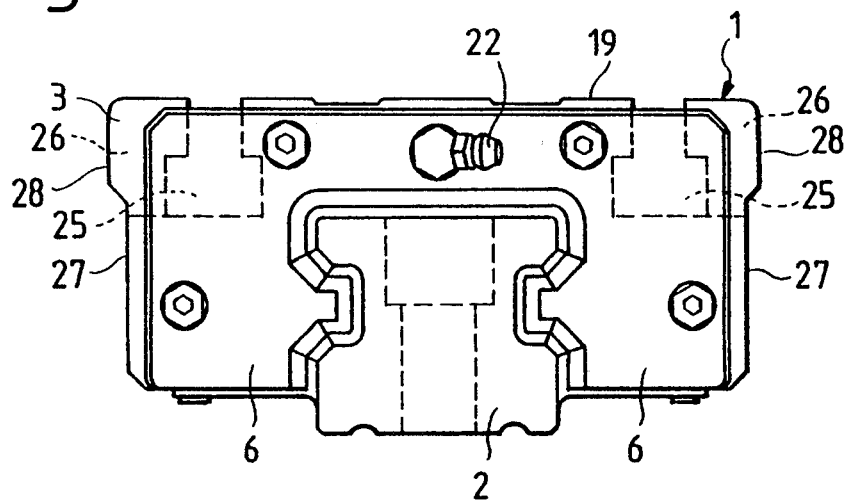
FIG. 3 is a front view of the linear motion rolling guide unit of FIG. 1, as seen from the direction A.

Now, one embodiment of the linear motion rolling guide unit according to the present invention will be described by referring to the accompanying drawings. In FIGS. 1 through 4, components identical with those shown in FIG. 9 through 12 are given like reference numerals.

The track rail 2 is secured to the base and the slider 1 is slidably mounted astride the track rail 2. The track rail 2 has raceway surfaces 5 formed in the raceway grooves on the longitudinally extending side wall surfaces 21. The slider 1 straddles the track rail 2 so as to be slidable on it. The slider 1 includes: a casing 3 having raceway surfaces 9 formed in the raceway grooves at positions facing the raceway surfaces 5 of the track rail 2; a number of rolling elements 7 such as cylindrical rolls or balls, trapped between the facing raceway surfaces 5 and 9 to allow relative motion between the slider and the track rail; ball retaining bands 18 enclosing the rolling elements 7 to prevent them from coming off the casing 3; under seals 8 to provide a seal between the track rail 2 and the casing 3; and end caps 6 attached to the longitudinal ends of the casing 3, the longitudinal direction being the direction in which the casing slides.

The end caps 6 are each provided with an end seal 17 that provides a seal between the rail 2 and the slider 1. The end caps 6 also have a grease nipple 22 for supplying lubricant to the sliding surfaces between the rail 2 and the slider 1. The end caps 6 are also formed, on each side, with raceway grooves 13 and direction changing passages 11. The raceway grooves 13 cooperate with the track rail 2 to form raceways through which the rolling elements 7 move. The direction changing passages 11 in the end caps cause the rolling elements 7 to change their direction for circulation.

This linear motion rolling guide unit is constructed as described above, with the slider 1 mounted astride the track rail 2 and with the rolling elements 7 trapped between the track rail 2 and the slider 1 to allow the slider 1 to freely slide on the track rail 2. The rolling elements 7, which run loaded along the raceway surfaces 5 on the track rail 2, are led into the direction changing passages 11 formed in the end caps 6 and from there into return passages 14 formed in the upper part of the casing 3 parallel to the raceway surfaces 9, thus endlessly circulating through the endless circulation path. In this way, with the loaded rolling elements 7 trapped and running between the raceway surfaces 9 formed in the casing 3 and the raceway surfaces 5 on the track rail 2, the slider 1 and the track rail 2 can slidably move relative to each other. Radial loads and moment loads acting through the slider 1 in vertical and horizontal directions are born by the track rail 2.

The linear motion rolling guide unit according to this invention is characterized by the construction of a mechanism for fixing components 34 (FIG. 4) such as slide table 4, equipment and work to the casing 3. That is, in this linear motion rolling guide unit, dovetail grooves 25 are formed extending longitudinally in the upper surface of the casing 3 so that a tool for fixing the component 34 to the casing 3 can be movably installed in the dovetail grooves 25. Insert dovetail grooves 26 communicating with the dovetail grooves 25 are formed extending laterally in the upper surface of the casing 3 to allow the fixing tool to be inserted through the insert dovetail grooves 26. The insert dovetail grooves 26 open at the upper side surfaces of the casing 3 to form insertion openings 28 through which to insert the fixing tool. This embodiment employs bolts and nuts as the fixing tools. The fixing tool comprises a bolt 30 having a polygonal head 32 and a nut 31 which is polygonal-shaped on the exterior and has a female thread with which the bolt 30 engages. Because the head 32 of the bolt 30 and the exterior of the nut 31 are shaped polygonal, it is possible to prevent them from being turned together during fastening or loosing operation so that the nut and bolt can easily be tightened or disengaged.

The upper surface of the casing 3 is formed with two dovetail grooves 25. The two dovetail grooves 25 extend parallel to each other and longitudinally of the track rail 2 and are arranged symmetrical with respect to the center line of the track rail 2. The dovetail grooves 25 open at the end surfaces of the casing 3 and the openings are closed by the end caps 6. The side surfaces 27 of the casing 3 are formed with the insert dovetail grooves 26 that communicate with the dovetail grooves 25. Thus, in the embodiment shown in FIG. 4, the hexagonal head 32 of the bolt 30 can be inserted through the insertion opening 28 formed at the side surface of the casing 3 and through the insert dovetail groove 26 into the dovetail groove 25. Therefore it is not necessary to remove the end cap 6 from the casing 3 to insert the bolt 30 (in the latter embodiments, nuts 31, 33) into the dovetail groove 25.

The process of fixing the slide table 4 to the casing 3 will be described. First, the head 32 of the bolt 30 is inserted from the insertion opening 28 into the insert dovetail groove 26 and then moved through the insert dovetail groove 26 into the dovetail groove 25. Next, the bolt 30 is slid along the dovetail groove 25 to the insertion hole 16 formed in the component 34 or the slide table 4, or to a position corresponding to the insertion hole formed in the component 34. Then, the bolt 30 is inserted into the insertion hole 16 and the nut 31 is fastened. In this way, since the position adjustment of the bolt 30 can be made by sliding the bolt 30 along the dovetail groove 25 formed in the upper surface 19 of the casing 3, the component 34 can be secured to the slider 1 even when the position of the insertion hole 16 cut in the component 34 is somewhat deviated in the longitudinal direction.

Further since the casing 3 of the slider 1 is formed with the dovetails 25, it is possible to directly fix the component 34 such as a work to the casing 3 itself. In that case, when compared with the conventional unit, in which a work is mounted on the dovetail-grooved slide table 24 that is in turn secured on the sliders 1, the overall cross-sectional height of the unit of this invention with the work mounted on the casing is smaller by the amount corresponding to the slide table, which is not interposed in this embodiment.

Figure 4:
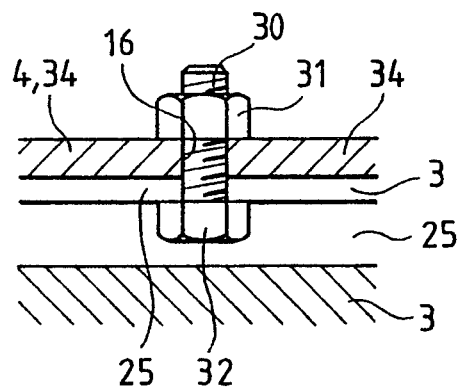
FIG. 4 is a cross section of one embodiment in which a bolt is shown to be inserted in the dovetail groove and fastened with a nut to secure the table to the casing.
Figure 5:
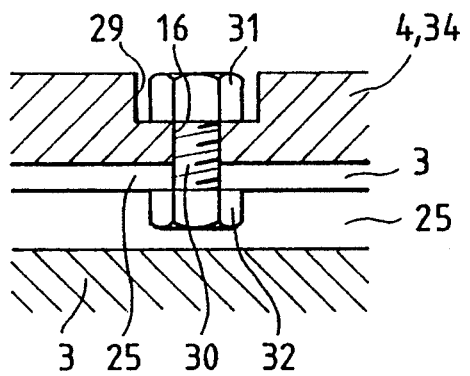
FIG. 5 is a cross section of another embodiment in which a bolt is shown to be inserted in the dovetail groove and fastened with a nut to secure the table to the casing.
Figure 6:
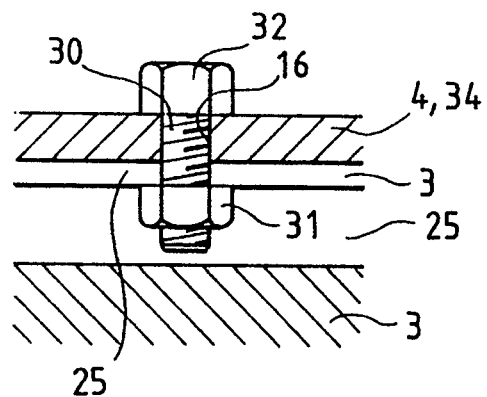
FIG. 6 is a cross section of another embodiment in which a nut is inserted in the dovetail groove and fastened with a bolt to secure the table to the casing.
Figure 7:
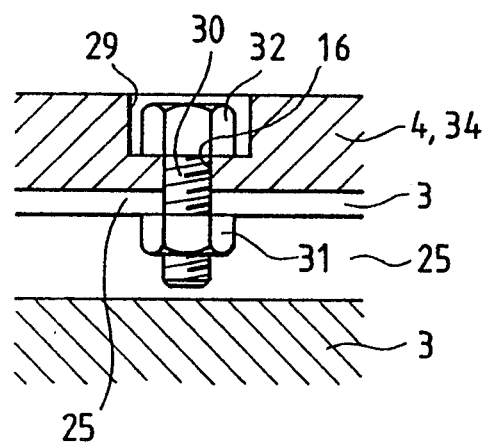
FIG. 7 is a cross section of still another embodiment in which a nut is inserted in the dovetail groove and fastened with a bolt to secure the table to the casing.

While the linear motion rolling guide unit of this embodiment has the bolt 30 inserted in the dovetail groove 25 as shown in FIG. 4, the fixing means is not limited to this structure but various other forms may be employed, including those shown in FIG. 5, 6 and 7.

Figure 8:
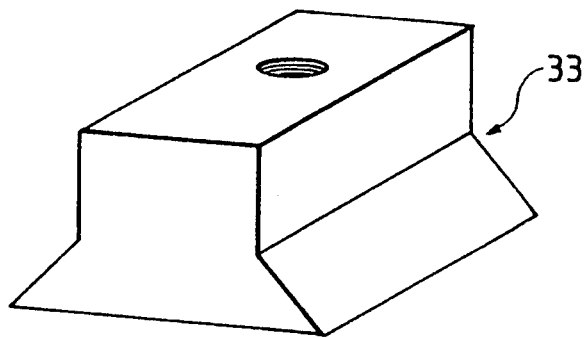
FIG. 8 is a perspective view of another embodiment of the nut in the fixing means.
Figure 9:
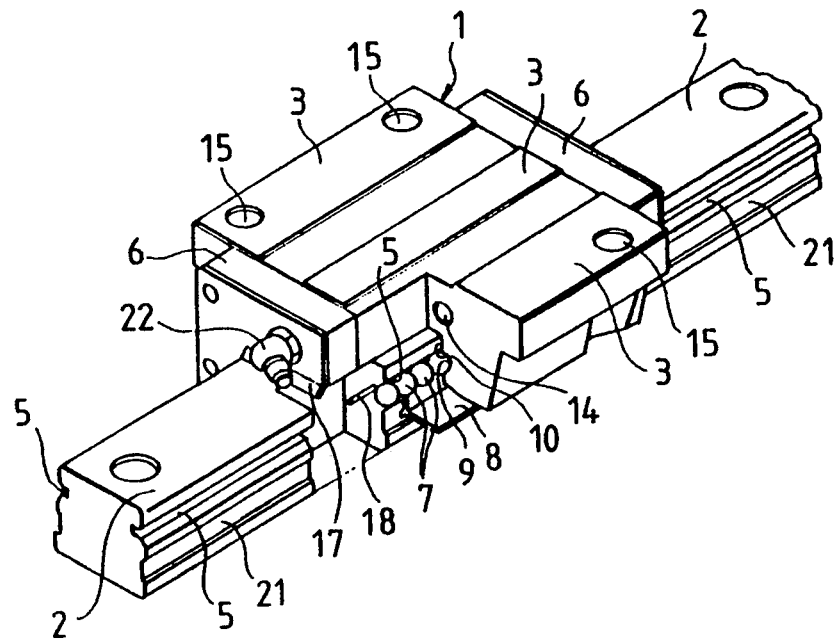
FIG. 9 is a partly cutaway perspective view showing an example of a conventional linear motion rolling guide unit.
Figure 10:
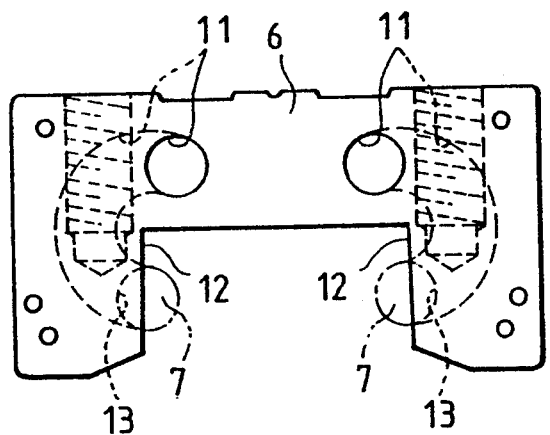
FIG. 10 is a front view of an end cap of the linear motion rolling guide unit shown in FIG. 9.
Figure 11:
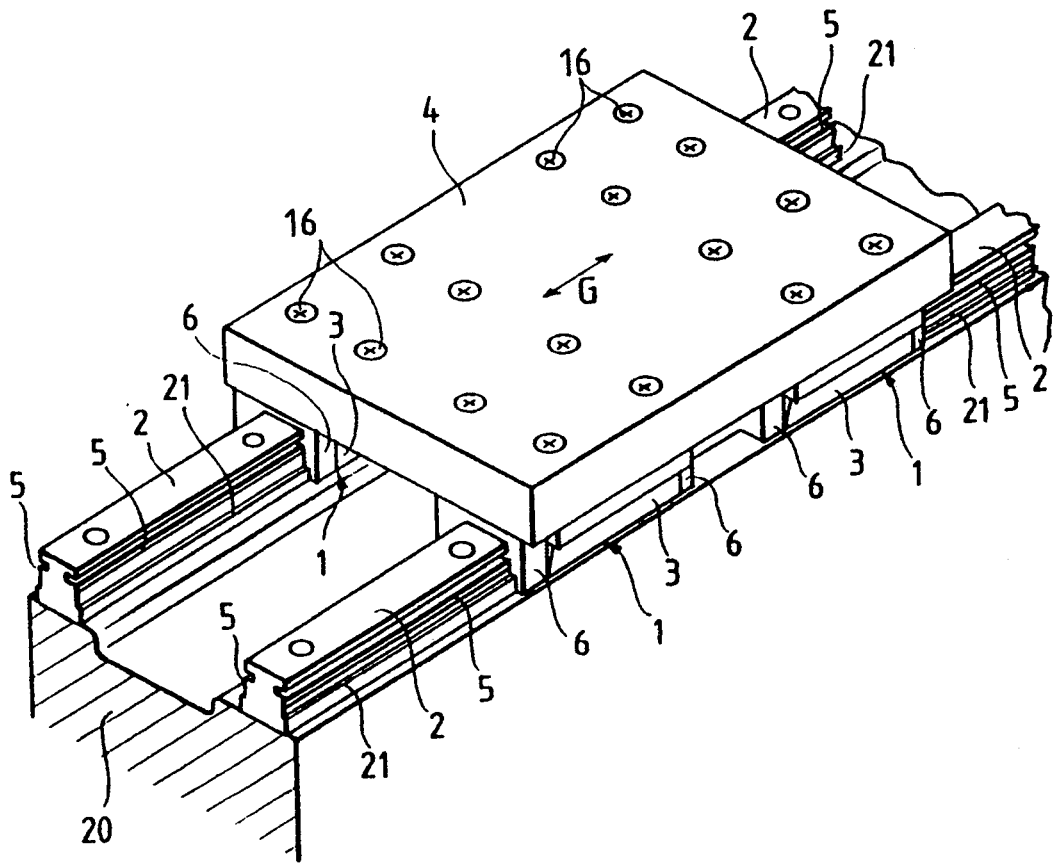
FIG. 11 is a perspective view showing an example use of the linear motion rolling guide unit of FIG. 9.
Figure 12:
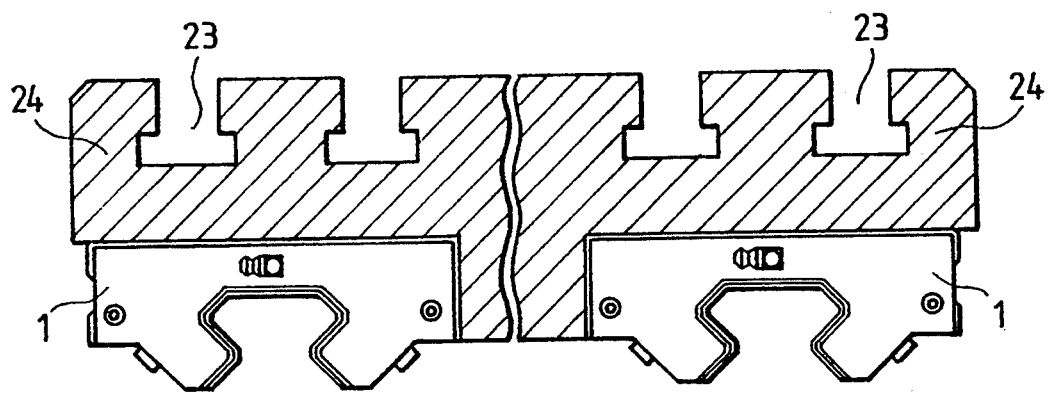
FIG. 12 is a cross section showing an example case where a dovetail-grooved slide table is mounted on the sliders in the conventional linear motion rolling guide unit.

Further, the nut 31 need not be shaped as a hexagon nut as in the case of the above embodiment, but it is possible to use a nut 33 shown in FIG. 8.

Another embodiment of the linear motion rolling guide unit will be described by referring to FIG. 5. FIG. 5 is a cross section of another embodiment, in which the bolt 30 is inserted in the dovetail groove 25 and tightened by the nut 31 to fasten the component 34 such as table 4 to the casing 3. This embodiment has the same structure and function as those of the previous embodiment of FIG. 4, except that the component 34 such as table 4 is formed with a recess 29 to receive the nut 31. In this embodiment, parts that are identical with those of the preceding embodiment are given like reference numerals, and their explanations are omitted.

Next, by referring to FIG. 6, still another embodiment of the linear motion rolling guide unit according to this invention will be described. FIG. 6 is a cross section of the third embodiment, in which the nut 31 is inserted in the dovetail groove 25 and tightened by the bolt 30 to fasten the component such as table 4 to the casing 3. This embodiment has the same structure and function as those of the previous embodiment of FIG. 4, except that the nut 31 is inserted in the dovetail groove 25. In this embodiment, parts that are identical with those of the preceding embodiment are given like reference numerals, and their explanations are omitted. In this construction, a certain degree of freedom can be provided in terms of the size and number of the screws.

Still another embodiment of the linear motion rolling guide unit according to this invention will be described by referring to FIG. 7. FIG. 7 is a cross section showing a fourth embodiment, in which the nut 31 is inserted in the dovetail groove 25 and tightened by the bolt 31 to fasten the component 34 such as table 4 to the casing 3. This embodiment has the same structure and function as those of the previous embodiment of FIG. 6, except that the component 34 such as table 4 is formed with the recess 29 to receive the head 32 of the bolt 30. In this embodiment, parts that are identical with those of the preceding embodiment are given like reference numerals, and their explanations are omitted.

Still another embodiment of the linear motion rolling guide unit according to this invention will be explained by referring to FIG. 8. FIG. 8 is a perspective view of another embodiment of the nut in the fixing means. The nut 33 is formed rectangular in the longitudinal direction to such a degree as will allow the nut 33 to be moved from the insert dovetail groove 26 to the dovetail groove 25 when being inserted in the dovetail groove 25. The nut 33 is similar to the hexagonal nut 31 in terms of the function of fastening with the bolt 30 but is characterized by the fact that it can be inserted and installed into the insertion opening 28, the insert dovetail groove 26 and the dovetail groove 25 reliably and easily.

I claim:

1. A linear motion rolling guide unit comprising:
   a track rail having first raceway surfaces formed on longitudinally extending sidewall surfaces;
   a casing slidable relative to the track rail and having second raceway surfaces formed at positions facing the first raceway surfaces;
   end caps each attached to each of the longitudinal ends of the casing;
   raceways formed between the first raceway surfaces and the second raceway surfaces;
   rolling elements circulating through the raceways, direction changing passages formed in the end caps and return passages formed in the casing;
   components mounted on the casing and having insertion holes;
   fixing means for fixing the components to the casing;
   dovetail grooves formed longitudinally in the upper surface of the casing so that the fixing means can be movably installed in the dovetail grooves;
   insert dovetail grooves formed laterally in the upper surface of the casing so that the insert dovetail grooves can receive the fixing means and communicate with the dovetail grooves to allow the fixing means to be installed in the dovetail grooves; and
   insertion openings formed by opening the insert dovetail grooves at the upper side surfaces of the casing.

2. A linear motion rolling guide unit according to claim 1, wherein the fixing means each comprise a bolt having a polygonal head and a nut which is polygonal-shaped on the exterior and has a female thread with which the bolt engages.

3. A linear motion rolling guide unit according to claim 2, wherein with the bolt installed in the dovetail groove, a portion of the bolt that projects from the dovetail groove in the casing passes through the insertion hole formed in the component.

4. A linear motion rolling guide unit according to claim 2, wherein either the head of the bolt or the nut is inserted in the dovetail groove and whichever is installed in the dovetail groove cannot be turned in the dovetail groove.

5. A linear motion rolling guide unit according to claim 2, wherein the components are formed with recesses in which either the bolt or the nut is installed, and wherein the bolt or the nut installed in the recesses does not project from the recesses.

6. A linear motion rolling guide unit according to claim 1, wherein the upper surface of the casing is formed with two of the dovetail grooves, and the two dovetail grooves extend parallel to each other in the longitudinal direction of the casing and are arranged symmetrical with respect to the center line of the track rail.

7. A linear motion rolling guide unit according to claim 1, wherein the dovetail grooves are formed in portions of the casing that are located outside the track rail to minimize the height of the casing.

8. A linear motion rolling guide unit according to claim 1, wherein the position of the fixing means can be adjusted by sliding it along the dovetail grooves formed in the upper surface of the casing.

9. A linear motion rolling guide unit according to claim 1, wherein the dovetail grooves open at the end surfaces of the casing and the openings of the dovetail grooves are closed by the end caps.

* * * * *